(12) United States Patent
Eguchi et al.

(10) Patent No.: US 7,447,859 B2
(45) Date of Patent: *Nov. 4, 2008

(54) METHOD OF PERFORMING ACTIVE DATA COPYING PROCESSING, AND STORAGE SUBSYSTEM AND STORAGE CONTROL APPARATUS FOR PERFORMING ACTIVE DATA COPYING PROCESSING

(75) Inventors: Yoshiaki Eguchi, Machida (JP); Hiroshi Arakawa, Sagamihara (JP); Takahiro Fujita, Tokyo (JP); Keishi Tamura, Odawara (JP); Yoshinori Okami, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/649,449

(22) Filed: Jan. 3, 2007

(65) Prior Publication Data

US 2007/0180274 A1 Aug. 2, 2007

Related U.S. Application Data

(63) Continuation of application No. 10/371,595, filed on Feb. 20, 2003, now Pat. No. 7,165,157.

(30) Foreign Application Priority Data

Feb. 20, 2002 (JP) ............................. 2002-043421

(51) Int. Cl.
*G06F 12/14* (2006.01)
*G06F 12/00* (2006.01)
*G06F 13/00* (2006.01)
*G06F 13/12* (2006.01)

(52) U.S. Cl. ................ 711/163; 711/100; 711/111; 711/112; 711/114; 711/152; 711/154; 711/161; 711/162; 710/5; 710/36; 710/37; 710/64; 710/72; 710/74; 710/200; 707/204

(58) Field of Classification Search .................. None
See application file for complete search history.

(56) References Cited

U.S. PATENT DOCUMENTS 5,155,845 A 10/1992 Beal et al.

(Continued)

FOREIGN PATENT DOCUMENTS

JP 10-333839 A 12/1998

(Continued)

OTHER PUBLICATIONS

*Working Draft SCSI Primary Commands-3 (SPC-3)*, T10/1416-D Revision 10, pp. 64-100, T10 technical committee of the International Committee on Information Technology Standards, (INCITS) (Nov. 2002).

*Primary Examiner*—Tanh Q Nguyen
(74) *Attorney, Agent, or Firm*—Townsend and Townsend and Crew LLP

(57) ABSTRACT

When an active data copy process relative to a logical storage device is performed without involving a computer, an access permission/rejection of the computer to the logical storage device is checked by referring to a correspondence between WWN of the computer and a logical storage device identifier LUN to thereby determine whether an access to a copy source logical storage device and a copy destination logical storage device is permitted or not. It is therefore possible to prevent an outflow of illegal data from a storage subsystem to be caused by an active copy instruction command.

6 Claims, 11 Drawing Sheets

U.S. PATENT DOCUMENTS

| | | |
|---|---|---|
| 5,742,792 A | 4/1998 | Yanai et al. |
| 5,787,485 A | 7/1998 | Fitzgerald et al. |
| 6,119,208 A | 9/2000 | White et al. |
| 6,247,103 B1 | 6/2001 | Kern et al. |
| 6,289,423 B1 | 9/2001 | Ozaki et al. |
| 6,343,324 B1 | 1/2002 | Hubis et al. |
| 6,356,979 B1 | 3/2002 | Sicola et al. |
| 6,363,385 B1 | 3/2002 | Kedem et al. |
| 6,484,229 B1 | 11/2002 | Ichikawa et al. |
| 6,502,162 B2 | 12/2002 | Blumenau et al. |
| 6,594,745 B2 | 7/2003 | Grover |
| 6,684,209 B1 | 1/2004 | Ito et al. |
| 6,715,031 B2 | 3/2004 | Camble et al. |
| 6,721,851 B2 | 4/2004 | Ohr |
| 6,721,862 B2 | 4/2004 | Grant et al. |
| 6,757,797 B1 | 6/2004 | Kaiya et al. |
| 6,775,830 B1 | 8/2004 | Matsunami et al. |
| 2001/0018743 A1 | 8/2001 | Morishita |
| 2001/0020254 A1 | 9/2001 | Blumenau et al. |
| 2001/0027501 A1 | 10/2001 | O'Hare et al. |
| 2001/0039548 A1 | 11/2001 | Shinaki et al. |
| 2002/0083339 A1 | 6/2002 | Blumenau et al. |
| 2002/0091828 A1 | 7/2002 | Kitamura et al. |
| 2002/0143903 A1 | 10/2002 | Urantani et al. |
| 2002/0188802 A1 | 12/2002 | Yagisawa et al. |
| 2002/0199073 A1 | 12/2002 | Tamura et al. |
| 2003/0014600 A1 | 1/2003 | Ito et al. |
| 2003/0126360 A1 | 7/2003 | Camble et al. |
| 2003/0196055 A1 | 10/2003 | Kamano et al. |
| 2003/0208589 A1 | 11/2003 | Yamamoto |
| 2004/0054866 A1 | 3/2004 | Blumenau et al. |
| 2004/0059882 A1 | 3/2004 | Kedem et al. |

FOREIGN PATENT DOCUMENTS

| | | |
|---|---|---|
| JP | 2000-276406 A | 10/2000 |
| JP | 2001-265655 A | 9/2001 |

FIG.3

| Bit<br>Byte | 7 | 6 | 5 | 4 | 3 | 2 | 1 | 0 | |
|---|---|---|---|---|---|---|---|---|---|
| 0 | colspan="8" | OPERATION CODE (83h) | | | | | | | ~3100 |
| 1 | colspan="8" | RESERVED | | | | | | | |
| 2 | colspan="8" | RESERVED | | | | | | | |
| 3 | colspan="8" | RESERVED | | | | | | | |
| 4 | colspan="8" | RESERVED | | | | | | | |
| 5 | colspan="8" | RESERVED | | | | | | | |
| 6 | colspan="8" | RESERVED | | | | | | | |
| 7 | colspan="8" | RESERVED | | | | | | | |
| 8 | colspan="8" | RESERVED | | | | | | | |
| 9 | colspan="8" | RESERVED | | | | | | | |
| 10 | colspan="8" rowspan="4" | PARAMETER LIST LENGTH (PARAMETER LENGTH) | | | | | | | ~3200 |
| 11 | | | | | | | | | |
| 12 | | | | | | | | | |
| 13 | | | | | | | | | |
| 14 | colspan="8" | RESERVED | | | | | | | |
| 15 | colspan="8" | CONTROL | | | | | | | |

FIG.5

| Bit<br>Byte | 7 | 6 | 5 | 4 | 3 | 2 | 1 | 0 | |
|---|---|---|---|---|---|---|---|---|---|
| 0 | DESCRIPTOR TYPE CODE (E0h) | | | | | | | | —5100 |
| 1 | Reserved | | NULL | PERIPHERAL DEVICE TYPE<br>(DEVICE TYPE) | | | | | —5200 |
| 2 | RESERVED | | | | | | | | |
| 3 | RESERVED | | | | | | | | |
| 4 | LOGICAL UNIT NUMBER<br>(LUN) | | | | | | | | —5300 |
| 11 | | | | | | | | | |
| 12 | WORLD WIDE NAME<br>(WWN) | | | | | | | | —5400 |
| 19 | | | | | | | | | |
| 20 | Reserved | | | | | | | | |
| 27 | | | | | | | | | |
| 28 | Device type specific parameters<br>( PARAMETERS SPECIFIC TO DEVICE) | | | | | | | | —5500 |
| 31 | | | | | | | | | |

FIG.6

| Bit<br>Byte | 7 | 6 | 5 | 4 | 3 | 2 | 1 | 0 | |
|---|---|---|---|---|---|---|---|---|---|
| 28 | Reserved | | | | | PAD | Reserved | | |
| 29 | DISK BLOCK LENGTH | | | | | | | | —6100 |
| 30 | | | | | | | | | |
| 31 | | | | | | | | | |

FIG.7

| Bit<br>Byte | 7 | 6 | 5 | 4 | 3 | 2 | 1 | 0 | |
|---|---|---|---|---|---|---|---|---|---|
| 28 | Reserved | | | | | PAD | Reserved | FIXED | |
| 29 | STREAM BLOCK LENGTH | | | | | | | | —7100 |
| 30 | | | | | | | | | |
| 31 | | | | | | | | | |

FIG.8

| Bit / Byte | 7 | 6 | 5 | 4 | 3 | 2 | 1 | 0 | |
|---|---|---|---|---|---|---|---|---|---|
| 0 | DESCRIPTOR TYPE CODE (00h,01h,0Bh,or,0Ch) | | | | | | | | ~8100 |
| 1 | Reserved | | | | | | | CAT | |
| 2 | DESCRIPTOR LENGTH (0014h) (DESCRIPTOR LENGTH) | | | | | | | | ~8200 |
| 3 | | | | | | | | | |
| 4 | SOURCE TARGET DESCRIPTOR INDEX ~8300 | | | | | | | | |
| 5 | | | | | | | | | |
| 6 | DESTINATION TARGET DESCRIPTOR INDEX ~8400 | | | | | | | | |
| 7 | | | | | | | | | |
| 8 | Reserved | | | | | | | | |
| 9 | STREAM DEVICE TRANSFER LENGTH (Byte) ~8500 | | | | | | | | ~8800 |
| 10 | | | | | | | | | |
| 11 | | | | | | | | | |
| 12 | Reserved | | | | | | | | |
| 13 | Reserved | | | | | | | | |
| 14 | BLOCK DEVICE NUMBER OF BLOCKS ~8600 | | | | | | | | |
| 15 | | | | | | | | | |
| 16 | BLOCK DEVICE LOGICAL BLOCK ADDRESS ~8700 (LBA) | | | | | | | | |
| 23 | | | | | | | | | |

| S_ID | HOST WWN |
|---|---|
| FFFF01 | 0123456789ABCDEF |
| FFFF02 | 0123456789ABCDEE |
| FFFF03 | 0123456789ABCDED |
| ...... | ............ |

METHOD OF PERFORMING ACTIVE DATA COPYING PROCESSING, AND STORAGE SUBSYSTEM AND STORAGE CONTROL APPARATUS FOR PERFORMING ACTIVE DATA COPYING PROCESSING

This application is a continuation of U.S. application Ser. No. 10/371,595, filed Feb. 20, 2003 now U.S. Pat. No. 7,165,157 issued Jan. 16, 2007.

BACKGROUND OF THE INVENTION

The present invention relates generally to a storage subsystem, a storage control apparatus and a data copying method, and more particularly to a storage subsystem for performing a data copy process without involving a computer, a storage control apparatus and a data copying method. The invention also relates to a storage subsystem having the fibre channel protocol standardized by ANSI X3T11 as an interface with upper level apparatuses.

The fibre channel protocol standardized by ANSI X3T11 can connect a number of apparatuses and can run at the same time a variety of protocols such as SCSI, ESCON® and TCP/IP. However, the fibre channel protocol has the nature of difficulty in maintaining security.

The characteristic features of the fibre channel will be described first. The fibre channel is a serial transfer protocol without a specific command set. It can use effectively the bandwidth of transmission media because it transfers information asynchronously. Although the fibre channel does not have a specific command set, it utilizes a physical transfer scheme as a transport path of command sets such as SCSI and ESCON®. It is therefore possible to accomplish data transfer of high speed and various types by inheriting conventional software resources.

The fibre channel is an interface having the characteristic features of both a channel and a network. Namely, once the source and destination are established, the fibre channel can perform data transfer of small delay and high speed. This is characteristic of the channel. An apparatus wishing communications participates in the communication system of the fibre channel upon an arbitrary event, and exchanges information with a communication partner apparatus to mutually recognize and start communications. This is characteristic of a network. A procedure of information exchange with a partner apparatus is called a log-in in particular.

An apparatus having an interface of the fibre channel is called a node, and the actual interface is called a port. One node can have one or more ports. The number of ports which can participate at the same time in the whole system of the fibre channel is the number represented by a 24-bit address at a maximum, i.e., about 16,770 thousands. A hardware used for such connection is called a fabric. Ports at the source and destination operate by considering only the information of the ports without being conscious of the fabric.

The fabric is therefore discussed in many cases as logical media.

Each of the node and port stores an identifier unique in the world assigned from the standardization institute based on the predetermined rule. This identifier corresponds to a MAC address of TCP/IP and is a fixed address in terms of hardware. This address is called a WWN (World Wide Name) and has an eight-byte area.

Communications of the fibre channel are achieved by using signal level information called an Ordered Set and information having a fixed format called a frame.

Each frame comprises: a 4-byte identifier called an SOF (Start of Frame) representative of the start of the frame; a 24-byte frame header for the control of a link operation and the characterization of the frame; a data field in which actual data to be transferred is written; a 4-byte cyclical redundancy code (CRC); and a 4-byte identifier called an EOF (End of Frame) representative of the end of the frame. The data field is variable in the range from 0 to 2112 bytes.

In the frame header, a 3-byte identifier D_ID for identifying the frame transmission destination port is written in the field from 23-rd to 0-th bits of the 0-th word, whereas a 3-byte identifier S_ID for identifying the frame transmission source port is written in the field from 23-rd to 0-th bits of the 1-st word. These identifiers have values effective for all frames to be transmitted and received.

The address identifier S_ID for identifying a transmission source port has a dynamically changing value reported from an upper level apparatus. In FC_CH, the identifier S_ID is assigned by the fabric during its initializing procedure and the assigned value depends on WWN or the like of the node and port of a frame transmission source.

In the frame to be transmitted from a transmission source during a log-in, WWN of the transmission source port is stored in the 8-byte field from 21-st byte to 28-th byte from the start of the data field following the frame header, whereas WWN of the transmission source node is stored in the 8-byte field from 29-th byte to 36-th byte from the start of the data field. Upon the reception of this frame, the request destination apparatus picks up the information contained in the frame, and if the log-in is to be accepted, transmits an ACC frame to the log-in request source, whereas if the log-in is to be rejected an LS-RJT frame is transmitted to the log-in request source.

Upon reception of a response of the ACC frame to the transmitted frame, the log-in request source can know a success of the log-in and enters the state that an I/O process such as data transfer can start. Upon reception of the LS_RJT frame, the I/O process relative to the log-in request destination is not allowed because the log-in was not succeeded.

The log-in of class 3 has been described above. Also in the log-in of other classes, WWN of a node and S_ID of a port are contained in the information to be passed from the log-in request source to the log-in request destination.

Conventional techniques on a method of preventing an illegal access to a storage subsystem are described, for example, in the Publications of JP-A-10-333839 and JP-A-2000-276406.

JP-A-10-333839 discloses a storage subsystem illegal access preventing method using the fibre channel protocol. According to this method, prior to activating an upper level apparatus such as a host computer accessing the storage subsystem, the storage subsystem stores beforehand: WWN (World Wide Name) for uniquely and statically identifying a fibre channel interface port (called a port) of the upper level apparatus; and a table storing a correspondence between the first-mentioned WWN and a specific port (WWN) in the storage subsystem or a correspondence between N_Port_Name and an arbitrary storage area in the storage subsystem. After the upper level apparatus is activated, the storage subsystem checks the contents of each frame issued from the upper level apparatus accessing the storage subsystem. If the N_Port_Name in the frame exists in the table, an access is permitted, whereas if it does not exist, an access reject frame LS-RJT is transmitted to the upper level apparatus to reject an access by the upper level apparatus having the N_Port_Name not existing in the table.

JP-A-2000-276406 discloses the techniques of solving the problems of the difficulty in applying JP-A-HEI-10-333839 to actual systems. The problems are as in the following. The communication performance is considerably limited because it is necessary to determine an access permission for each and every frame. If the access subject is not a port but a partial area in the storage subsystem, the upper level apparatus is required to write WWN in all frames to be transmitted. This results in that the upper level apparatus is required to satisfy the specification out of the standard fibre channel protocol.

According to the disclosed techniques, the storage subsystem stores beforehand: WWN for uniquely and statically identifying an upper level apparatus such as a host computer accessing the storage subsystem or a port of the upper level apparatus; or a table storing a correspondence between a node name (WWN) of the upper level apparatus and each storage area in the storage subsystem permitted or rejected to be accessed. The storage subsystem also stores a table storing a correspondence between WWN of a node and S_ID of a port to be dynamically assigned in the log-in process prior to information transmission/reception, for the identification of the upper level apparatus or the port thereof in order for the upper level apparatus to communicate with the storage subsystem by using the fibre channel interface. Upon an event that an information acquisition request is issued from the upper level apparatus to the storage area in the storage subsystem by using an Inquiry command, each table is searched and compared by using the S_ID contained in the request frame as a search key. In this manner, an access permission/rejection of the storage area is determined.

In some cases, an upper level apparatus performs setting/controlling of the storage subsystem, such as a remote copy and a snap shot of a storage area, by using a control command different from a general read/write command. SNIA (Storage Network Industry Association) standardizes an SAN (Storage Area Network). SNIA is constituted of vendors of SAN products of hardware and software. The backup section meeting of SNIA standardizes SCSI EXTENDED COPY as a SCSI extended protocol for use with SAN. A plurality of vendors intend to use the common specification standardized by the section meeting. SCSI EXTENDED COPY is a common protocol for the communications between apparatuses. This protocol can perform server-less backup of data in a storage, without involving a host computer connected by the fibre channel protocol such as SAN.

SUMMARY OF THE INVENTION

FIGS. 1A and 1B show the relation between a storage subsystem and host computers. With reference to FIGS. 1A and 1B, the problems associated with related art will be described.

Consider the storage subsystem 1100 and the host computers connected to the storage subsystem 1100 shown in FIGS. 1A and 1B. Host computers connected to the storage subsystem 1100 include a host computer A 1030, a host computer B 1020 and a backup server C 1010. It is assumed that the backup server C 1010 has a function of backing up (1600) data in the storage subsystem 1100 into a tape apparatus (tape record/reproduction apparatus) 1210 by using a snap shot 1300 or the like. It is assumed that the storage subsystem 1100 has logical storage devices LU_A1110, LU_B1120 and LU_C11130. It is also assumed that the host computer A 1030, host computer B 1020 and backup server C 1010 are permitted to access only the logical storage devices LU_A1110, LU_B1120 and LU_C1130 of the storage subsystem, respectively, as shown in FIG. 1A (access permission 1400). This access is checked from WWN for uniquely identifying a port of the fibre channel of the upper level apparatus such as a host computer, as described earlier. It is also assumed that LU_C 1130 is a volume for obtaining a replication (static image) of LU_A1110 at an arbitrary time.

It is assumed that the host computer A performs an I/O process relative to LU_A, the host computer B performs an I/O process relative to LU_B, and the backup server C backs up the data in LU_C in accordance with a schedule set by a user. In this case, according to related art, when the host computer B 1020 tries to access the logical device LU_A or LU_C in the storage subsystem 1100, the storage subsystem 1100 checks WWN of the host computer B 1020 so that the host computer B 1020 cannot access (log in) the logical device LU_A 1110 or LU_C 1130 (1500).

However, as shown in FIG. 1B, data in the storage area not accessible can be illegally accessed in the following manner. The host computer B issues the SCSI EXTENDED COPY command to the accessible LU_B 1120. If the contents of the command are a copy of data to an external of the storage subsystem, e.g., a tape apparatus (tape record/reproduction apparatus) 1220 accessible by the host computer B, from the logical device LU_C 1130 not accessible by the host computer B, then an outflow of data stored in the logical device LU_A 1110 or LU_C 1130 cannot be checked.

Related art described above is associated with the problem that data in the storage area not accessible can be illegally accessed.

In order to solve the above-described problem associated with related art, a storage subsystem which performs a data copy process without involving a computer, a storage control apparatus and a data copying method are described.

A storage subsystem capable of preventing illegal data copy, a storage control apparatus and a data copying method are also described, wherein a security check at the WWN level of a copy source volume is realized for a data copy of the storage subsystem by using a control command such as a SCSI EXTENDED COPY command, and an access to the storage subsystem and a storage area in the storage subsystem from a plurality of upper level apparatuses is selectively limited.

There is provided a storage subsystem coupled to a computer, comprising: a logical storage device to which an I/O process is performed by the computer; a judgment unit which determines whether an access to the logical storage device is permitted or not, in accordance with a data copy instruction from the computer for a data copy process relative to the logical storage device; and a data copy processing unit responsive to the data copy instruction from the computer which data copy processing unit performs the data copy process relative to the logical storage device without involving the computer, in accordance with a determination result by the determination unit.

There is also provided a data copying method of performing a data copy process relative to a logical storage device without involving a computer, comprising the steps of: determining from a data copy instruction from the computer whether an access to the logical storage device is permitted or not; and performing the data copy process relative to the logical storage device in accordance with an access permission/rejection determination result of the logical storage device.

As above, an access permission/rejection is determined to thereby control the data copy process without involving the computer, i.e., to actively control the data copy process.

An active data copy process means that without involving the resource of a computer (host computer), a peripheral apparatus (either a logical peripheral device or a physical peripheral device) received a copy instruction command issued by the computer processes the copy instruction.

According to the above described techniques, a security check at the WWN level of a copy source volume is realized for a data copy instruction from the inside of the storage subsystem using a control command such as a SCSI EXTENDED COPY command, and an access to the storage subsystem and a storage area in the storage subsystem from a plurality of upper level apparatuses is selectively limited to prevent illegal data copy.

Other objects, features and advantages of the invention will become apparent from the following description of the embodiments of the invention taken in conjunction with the accompanying drawings.

BRIEF DESCRIPTION OF THE DRAWINGS

FIG. 3 is a diagram showing the structure of a CDB (Command Descriptor Block) of an EXTENDED COPY command.

FIG. 5 is a diagram detailing the contents of each of target descriptors 4500 written from 16-th byte to n-th byte in the command parameter list shown in FIG. 4.

FIG. 6 is a diagram detailing an example of the contents of device specific parameters described from 28-th byte to 31-st byte of the target descriptor shown in FIG. 5.

FIG. 7 is a diagram detailing another example of the contents of device specific parameters described from 28-th byte to 31-st byte of the target descriptor shown in FIG. 5.

FIG. 8 is a diagram detailing an example of the contents of each of segment descriptors written from (n+1)-th byte to (n+m)-th byte in the command parameter list shown in FIG. 4.

DETAILED DESCRIPTION OF THE EMBODIMENTS

Embodiments of a storage subsystem, a storage control apparatus and a data copying method according to the invention will be described with reference to the accompanying drawings. The invention is not limited only to the following embodiments.

Figure 1A:
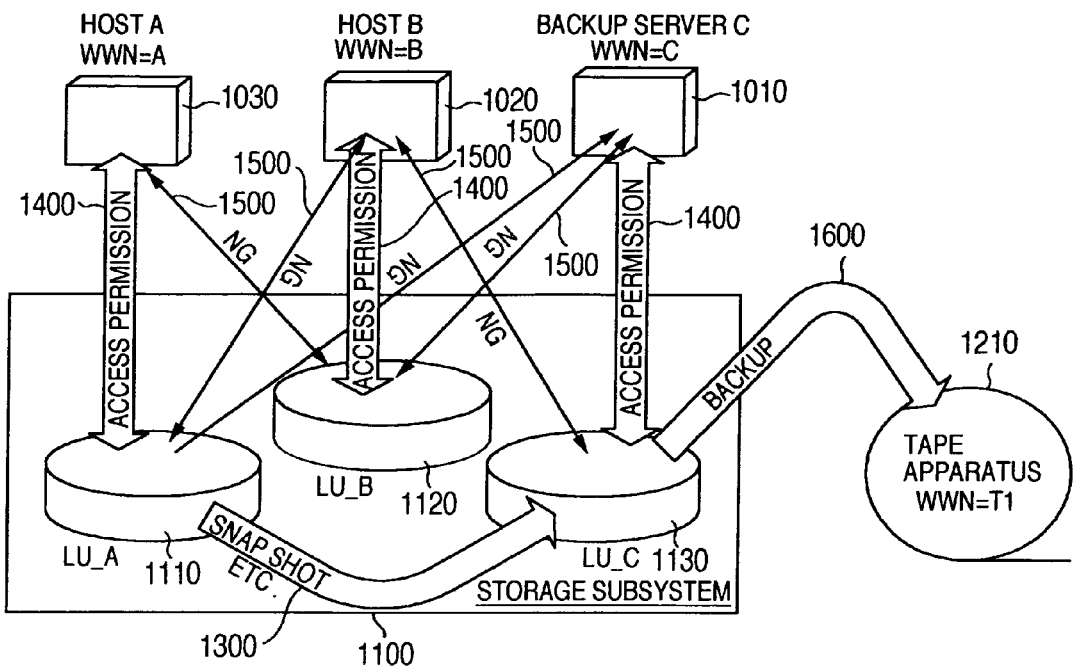
FIGS. 1A and 1B are diagrams showing the relation between the storage subsystem and host computers illustrating the problem associated with related art.
Figure 1B:
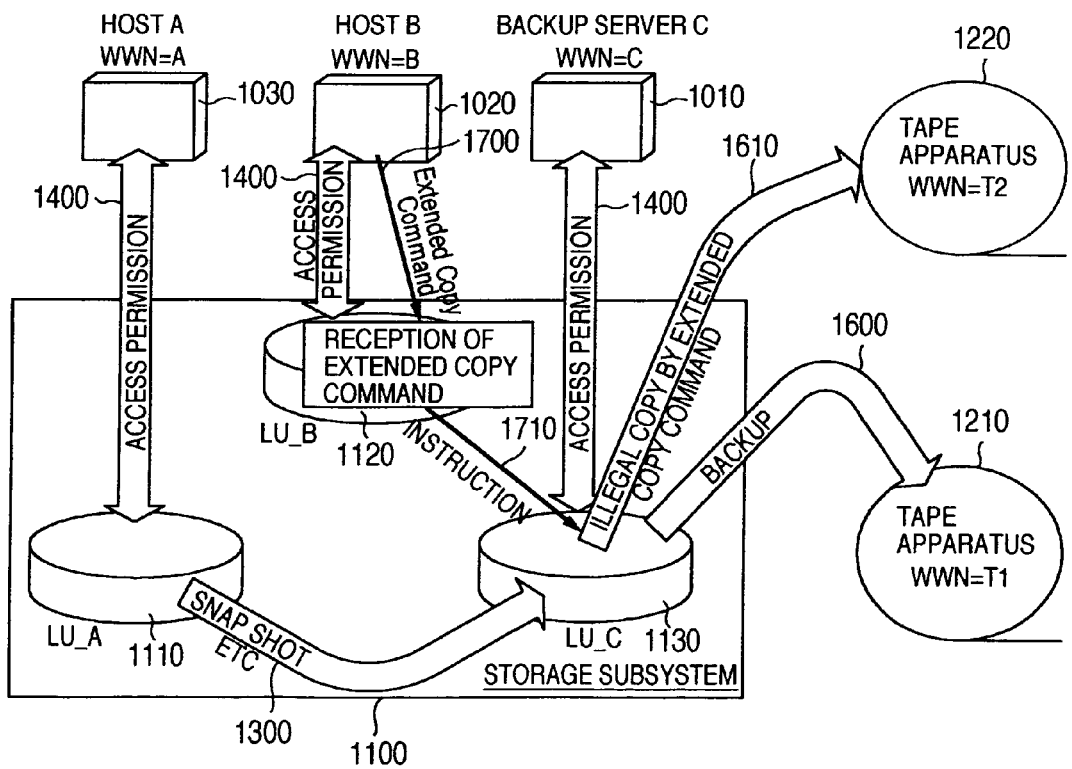
Figure 2:
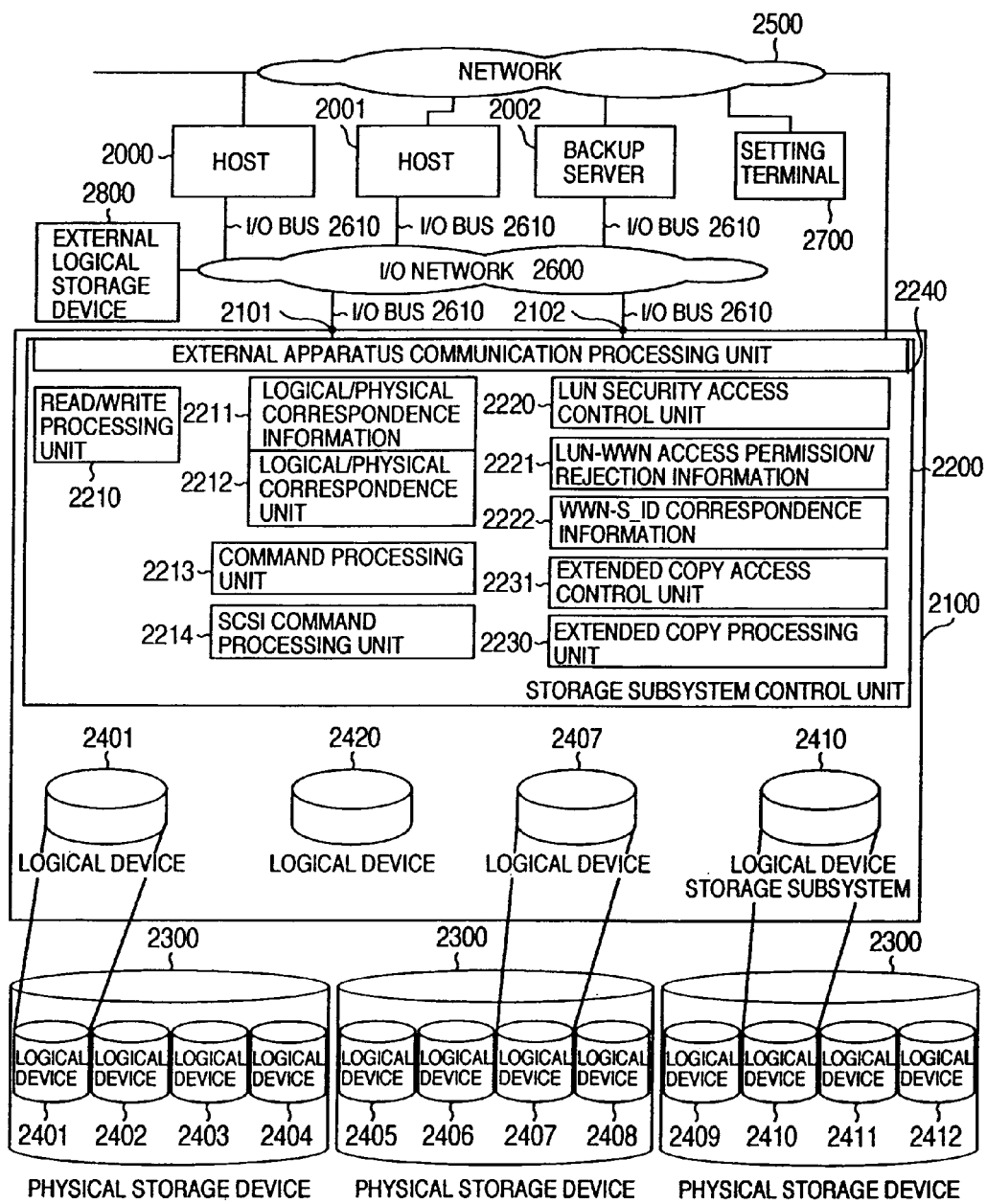
FIG. 2 is a block diagram showing the structure of a computer system using a storage subsystem according to an embodiment of the invention.

FIG. 2 is a block diagram showing the structure of a computer system using the storage subsystem according to an embodiment of the invention. In FIG. 2, reference numerals 2000 and 2001 represent host computers, 2002 represents a backup server, 2100 represents a storage server, 2200 represents a storage subsystem control unit (storage control apparatus), 2210 represents a read/write processing unit, 2211 and 2212 represent logical/physical correspondence information, 2213 represents a command processing unit, 2214 represents a SCSI command processing unit, 2220 represents a LUN security access control unit, 2221 represents LUN-WWN access permission/rejection information, 2222 represents WWN-S_ID correspondence information, 2230 represents an EXTENDED COPY processing unit, 2231 represents an EXTENDED COPY access control unit, 2240 represents an external apparatus communication processing unit, 2300 represents a physical storage device, 2401 to 2412 and 2420 represent logical devices, 2500 represents a network, 2600 represents an I/O network, 2610 represents an I/O bus, and 2700 represents a setting terminal.

The computer system shown in FIG. 2 has the host computers 2000 and 2001, backup server 2002, storage subsystem 2100 and setting terminal 2700 respectively interconnected by the network 2500. The network 2500 may be Ethernet®, FDDI, fibre channel, public telephone line or the like, and the setting terminal is generally used for the maintenance and management works of the storage subsystem.

The host computers 2000 and 2001 and backup server 2002 are also connected to the storage subsystem 2100 via the I/O network 2600 and I/O buses 2610 and issue an I/O processing request for data read/write to the storage subsystem 2100. The I/O network 2600 and I/O buses 2610 are connected to the ports 2101 and 2102 of the storage subsystem 2100. The port has a fibre channel interface for receiving an I/O processing request (communication processing request) from a computer and is a communication port capable of transmitting/receiving a SCSI command. When the host computers 2000 and 2001 and backup server issue an I/O processing request, they access data in the storage subsystem 2100 generally by using an address of a logical storage area. The I/O network 2600 and I/O bus 2610 may be one of various means such as fibre channel, SCSI, ESCON®, Ethernet®, and Infiniband®.

The external communication processing unit 2240 of the storage subsystem 2100 performs communication processing of the host computers, backup server, setting terminal and the like with an external apparatus by providing a proper interface which matches the communication transmission path such as fibre channel, SCSI, ESCON® and Ethernet®, a protocol and the like.

The apparatuses connectable to the storage subsystem 2100 are not limited only to two host computers and one backup server, but at least one or more host computers may be connected to one or more storage subsystems.

The invention aims to provide a security mechanism for a storage device when one device received a command from a host computer copies data to the same or different device without involving the host computer. More specifically, in the computer system, if a peripheral apparatus (both logical and physical apparatuses) received a copy instruction command issued from a host computer has an ability to process the copy instruction, the peripheral apparatus becomes an initiator without utilizing the resources of the host computer. This peripheral apparatus copies data in some area of a storage device designated by the contents of the command to some area of the same or different storage device. In the so-called server-less data copy scheme, it is therefore an object of the invention to provide a storage device executing the data copy scheme with a security mechanism.

Such a command is supported presently by the EXTENDED COPY command of SCSI. Embodiments of the invention will be described by using this command by way of example. As the I/O bus interconnecting the host computer and storage subsystem, a fibre channel is used by way of example in the following embodiments of the invention. The fibre channel can achieve communication control of transmission/reception of a SCSI command.

The storage subsystem 2100 is constituted of the storage subsystem control unit 2200 and a plurality of physical storage devices 2300. In a storage subsystem of a large capacity, a disk array of a plurality of physical storage devices is used in order to ensure security and reliability of the storage subsystem. In this disk array, logical storage areas are formed which are supplied as logical devices 2401 to 2412 and 2420 together with other logical devices to the host computers connected to the storage subsystem.

In the storage subsystem control unit 2200, upon reception of a read/write processing request for the physical storage device 2300, the logical/physical correspondence unit 2212 acquires a logical/physical correspondence by referring to the logical/physical storage area correspondence information 2211. The read/write unit 2210 performs a read/write processing relative to a proper storage area. The storage subsystem control unit 2200 also processes various requests from a host computer and supplies the setting terminal 2700 and host computers with information necessary for the storage subsystem maintenance/management, such as operation information, failure information and management information of the storage subsystem.

The storage subsystem control unit 2200 has the LUN security access control unit 2220 which performs LUN access control in accordance with: the information 2221 on a correspondence between WWN of a host computer trying to connect the storage subsystem 2100 and access permission/rejection for LUN as the identifier of each of the logical devices 2400 to 2412 and 2420 in the storage subsystem 2100; the information 2222 on a correspondence between S_ID in a fibre channel frame transmitted when a host computer tries to connect the storage subsystem via the fibre channel and WWN of the host computer; the information 2221 on a correspondence between WWN of a host computer and access permission/rejection for LUN; and the information 2222 on a correspondence between S_ID and WWN of a host computer.

The storage subsystem control unit 2200 also has the EXTENDED COPY command processing unit 2230 and EXTENDED COPY access control unit 2231. The EXTENDED COPY command processing unit 2230 analyzes the EXTENDED COPY command of SCSI issued to a particular logical device and performs proper processing. The EXTENDED COPY access control unit 2231 prevents an outflow of illegal data to be caused by the EXTENDED COPY command. The logical device may or may not have a storage area mapped to a physical storage area. The logical devices 2401, 2407 and 2410 are the logical devices having storage areas mapped to the physical storage areas, and the logical device 2420 is the logical device without a storage area mapped to the physical storage area. A plurality of storage subsystem control units may be provided in the storage subsystem.

The storage subsystem control unit 2200 has information necessary for the system to perform various processes, such as the system structure information, e.g., access operation information relative to logical storage devices and caches, parity group structural information, its RAID level information and the like. These pieces of information are not important when the embodiments of the invention are described, and so the description thereof is omitted. Each of the host computer, backup server, storage subsystem control unit and setting terminal has constituent elements essential for a general computer, such as a memory for storing programs and information necessary for various processes, a CPU and an internal data bus. These elements are not important when the embodiments of the invention are described, and so the description thereof is omitted.

Next, the format of a SCSI EXTENDED COPY command will be described by taking as an example a copy from a block device to a stream device, with reference to the drawings given in Information technology —SCSI Primary Command-3 (SPC3) disclosed by the t10 Technical Committee as the draft of SCSI command sets.

FIG. 3 is a diagram showing the structure of a CDB (Command Descriptor Block) of the EXTENDED COPY command.

CDB of the EXTENDED COPY command has 16 bytes. A process code 3100 described in the 0-th byte is 83h (h indicated a hexadecimal notation). The area from 1-st byte to 9-th byte and 14-th byte is a reserved area. A parameter list length 3200 representative of the length of a parameter list of the EXTENDED COPY command is written in the area from 10-th byte to 13-th byte.

A parameter necessary for the execution of an EXTENDED COPY command is designated by CDB and transmitted being written in a data-out buffer during a data-out phase after the phase of CDB. In this data-out phase, an initiator of SCSI transmits data designated by the command from a host computer to the target of the storage subsystem.

If the value of the parameter list length 3200 is 0, it means that no data was transmitted and does not mean an error.

Figure 4:
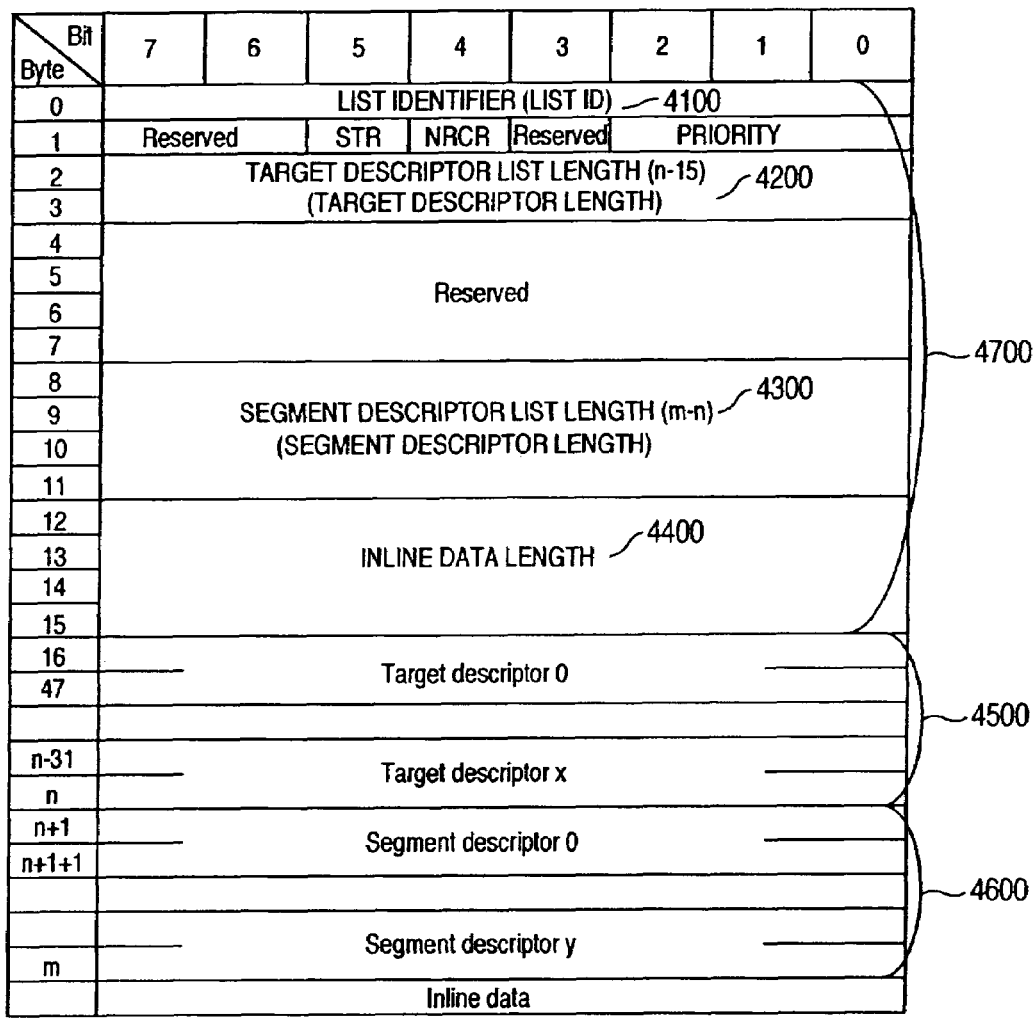
FIG. 4 is a diagram showing the structure of an EXTENDED COPY command parameter list.

FIG. 4 is a diagram showing the structure of an EXTENDED COPY command parameter list. This list shows the format of a command parameter list necessary for the execution of the EXTENDED COPY command described in the data-out buffer, if it is determined that the CDB process code is 83h and the command is the EXTENDED COPY command, as described with reference to FIG. 3. The parameter list length 3200 shown in FIG. 3 is the length of the parameter list represented by the byte value.

The parameter list of the EXTENDED COPY command is constituted of: a header 4700 of 16 bytes; target descriptors 4500, segment descriptors 4600 and optional inline data. The header 4700 is constituted of data including a list identifier 4100, an STR, an NRCR, a command priority, a length 4200 of the target descriptors, a length 4300 of the segment descriptors and a length 4400 of the inline data.

The list identifier 4100 at 0-th byte is selected by a client application in order to make a copy manager uniquely identify the SCSI EXTENDED COPY command. The 7-th, 6-th and 3-rd bits of 0-th byte are reserved areas. STR is written at 5-th bit, NRCR is written at 4-th bit, and PRIORITY is written at 2-nd to 0-th bits.

The target descriptor length 4200 is written in 2-nd and 3-rd bytes, this length being the length 4600 of the target descriptors 4500 written from 16-th byte. The 4-th to 7-th bytes are reserved areas. The segment descriptor length 4300 is written in 8-th to 11-th bytes, this length being the length of the segment descriptors 4600 written from (n+1)-th byte. n is the last number of the bytes in which the target descriptors in the parameter list are written.

FIG. 5 is a diagram showing the details of the contents of the target descriptors 4500 in 16-th byte to n-th byte in the command parameter list shown in FIG. 4. Each target descriptor is written by 32 bytes and has the data of copy source and destination of the EXTENDED COPY command.

A descriptor type code 5100 is written in 0-th byte of the target descriptor. If the descriptor is the target descriptor of WWN of fibre channel, this code is E0h. A device type 5200 is written in 1-st byte. A LUN 5300 of a target is written in 4-th to 11-th bytes. A WWN 5400 of the target is written in 12-th to 19-th bytes. Device type specific parameters 5500 are written in 28-th to 31-st bytes, these parameters being specific to the device type of the target.

FIG. 6 is a diagram showing an example of the details of the contents of the device specific parameters 5500 written in 28-th to 31-st bytes of the target descriptor shown in FIG. 5. The format of this target descriptor is used when the device type designated at 4-th to 0-th bits of the 1-st byte is a block device (e.g., disk).

FIG. 7 is a diagram showing another example of the details of the contents of the device specific parameters 5500 written in 28-th to 31-st bytes of the target descriptor shown in FIG. 5. The format of this target descriptor is used when the device type designated at 4-th to 0-th bits of the 1-st byte is a sequential access device (e.g., tape).

FIG. 8 is a diagram showing an example of the details of the contents of one segment descriptor 4600 written in (n+1)-th to (n+m)-th bytes of the command parameter list shown in FIG. 4. The data length m is the length of data of the segment descriptor written in the parameter list.

The 0-th byte of the target descriptor is a descriptor type code 8100. If a copy is from a block device to a sequential access device or a copy is from a sequential access device to a block device, one of the codes 00h, 01h, 0Bh and 0Ch is written. A descriptor length 8200 is written in 2-nd and 3-rd bytes, the descriptor length being the length of the remaining segment descriptors 8800. The code written in the descriptor length is 14h if the copy is from a block device to a tape device.

A source target descriptor index 8300 of the copy source is written in 4-th and 5-th bytes. A destination target descriptor index 8400 of the copy destination is written in 6-th and 7-th bytes. These indices correspond to the indices of the target descriptors 4500 in the command parameter list shown in FIG. 4. A stream device transfer length 8500 is written in 9-th to 11-th bytes and defines the amount of data to be written in the stream device. A block device block number 8600 is written in 14-th and 15-th bytes and corresponds to the disk block length 6100 written in the format of the target descriptor shown in FIG. 5. A block device logical block address (LBA) 8700 written in 16-th to 23-th bytes is the first logical block address in the block device.

The formats of the EXTENDED COPY command described above and shown in FIGS. 3 to 8 are disclosed in the draft of the SCSI command set by the t10 Technical Committee. Although there is a possibility that the contents of the formats are changed, the above description illustratively shows that information capable of identifying copy source and destination such as target WWN and LUN is contained in the formats. A change in the details of the EXTENDED COPY command will not influence fundamentally the contents of the invention.

Next, the control of an illegal access to the device by an EXTENDED COPY command will be described.

If a fibre channel is used, the EXTENDED COPY command is written in a fibre channel frame and transmitted from an upper level apparatus to the storage subsystem. First, the fibre channel frame will be described.

Figure 9:
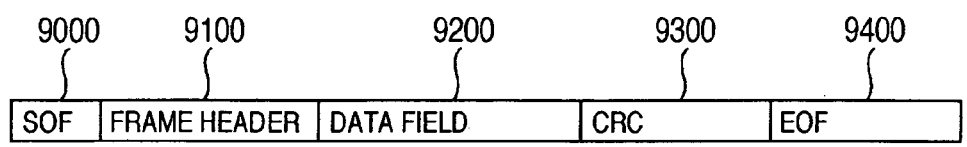
FIG. 9 is a diagram showing the structure of a fibre channel frame.

FIG. 9 is a diagram showing the structure of a fibre channel frame. The fibre channel frame is constituted of: a 4-byte identifier called an SOF (Start of Frame) 9000 indicating the start of the frame; a 24-byte frame header 9100 for the control of a link operation and the characterization of the frame; a data field 9200 of data to be transferred; a 5-byte cyclical redundancy code (CRC) 9300; and a 4-byte identifier called an EOF (End of Frame) 9400 indicating the end of the frame. The data field is variable in the range from 0 to 2,112 bytes.

Figure 10:
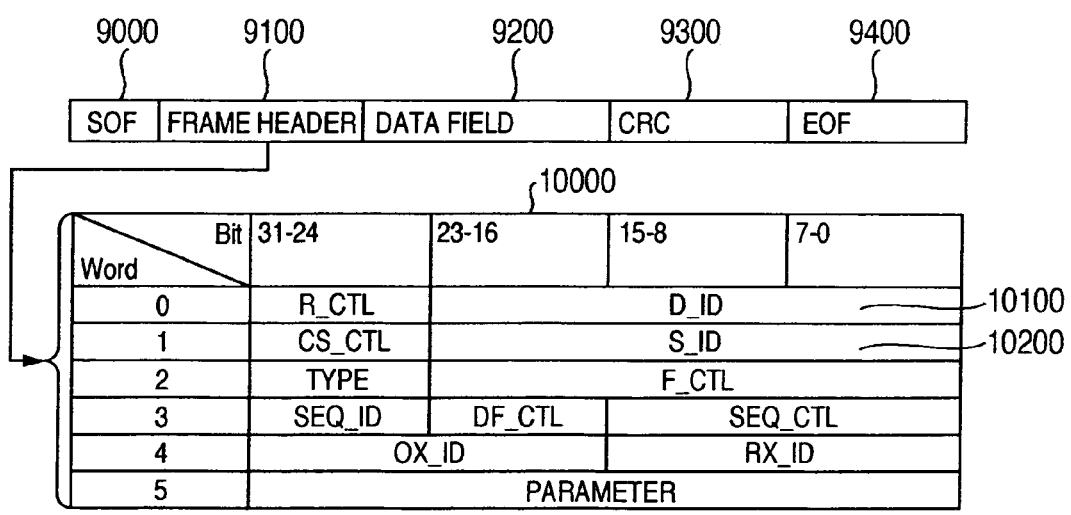
FIG. 10 is a diagram showing the structure of a frame header of the fibre channel frame.

FIG. 10 is a diagram showing the structure of the frame header 9100 of the fibre channel frame.

The frame header 9100 is constituted of six words. A destination ID D_ID 10100 is written in the area from 23-rd bit to 0-th bit of 0-th word, and a source ID (S_ID) 10200 is written in the area from 23-rd bit to 0-th bit of 1-st word. S_ID 10200 is a 3-byte address identifier for identifying the port from which the fibre channel frame is transmitted. D_ID 10100 is a 3-byte address identifier for identifying the port at which the fibre channel frame is received. Both the identifiers have the values effective for all frames to be transmitted and received. S_ID 10200 is information which can dynamically and uniquely identify the upper level apparatus (host computer, backup server and the like). S_ID 10200 is reported from the upper level apparatus when a log-in starts in order to exchange information between the transmission source from which the fibre channel frame is transmitted via the fibre channel to the transmission destination. S_ID is used when a logical session is established between the devices.

By using the fibre channel frame, the host computer, backup server and the like can perform the I/O process via the storage subsystem and fibre channel.

Next, an example of an information table possessed by the storage subsystem will be described. This information table is used when the storage subsystem receives a fibre channel frame containing a SCSI EXTENDED COPY command from an upper level apparatus (host computer, backup server and the like) via the fibre channel network.

Figures 11, 12:
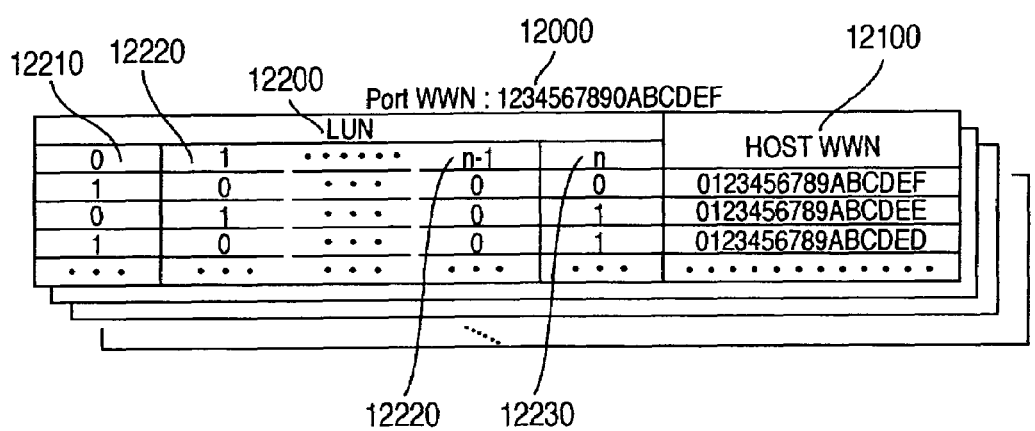
FIG. 11 shows an example of a table storing a correspondence between S_ID in the fibre channel frame transmitted from an upper level apparatus to the storage subsystem and a WWN of the upper level apparatus.
FIG. 12 is a diagram showing an example of LUN-WWN access permission/rejection information shown in FIG. 2.

FIG. 11 is a diagram showing a table having a correspondence between WWN of an upper level apparatus (e.g., host computer) and S_ID in the fibre channel frame transmitted form the host computer to the storage subsystem.

The table shown in FIG. 11 is formed, for example, by acquiring WWN of a host computer (port of a host computer bus adaptor) and S_ID from the fibre channel frame when the host computer logs in the storage subsystem via the fibre channel.

After the log-in, the fibre channel performs communications generally by using S_ID and D_ID. The first column 11100 of the table shown in FIG. 11 is for S_ID and the second column 11200 is for WWN of a host computer.

Upon the reception of a fibre channel frame, the storage subsystem acquires S_ID in the fibre channel frame and searches the first column of the table to acquire the WWN corresponding to the matched S_ID. In this manner, WWN of the host computer which transmitted the fibre channel frame can be identified.

The log-in process for a fibre channel is not directly related to the invention, and so the description thereof is omitted.

When the host computer transmits the EXTENDED COPY command to a logical device of the storage subsystem after the fibre channel log-in, the storage subsystem control unit 2200 for controlling the logical device which receives the command acquires S-ID from the fibre channel frame header and identifies WWN of the host computer which transmitted the frame corresponding to S_ID, by referring to the table shown in FIG. 11.

FIG. 12 is a diagram showing an example of the LUN-WWN access permission/rejection information 2221 shown in FIG. 2. A correspondence between a host computer having WWN and accessible LUN is stored in the form of a table. WWNs 12100 of host computers are related to LUNs 12000 of each port (WWN of each port: 1234567890ABCDEF) of the storage subsystem.

The table shown in FIG. 12 of this embodiment is formed for each port of the storage subsystem. The number of tables corresponds to the number of ports of the storage subsystem. For example, this table is formed by using an input unit and a display unit for confirming input information of a maintenance apparatus capable of communications with the storage subsystem, e.g, the setting terminal 2700.

Also for the external storage devices of the storage subsystem (e.g., storage devices of another storage subsystem and external logical storage device 2800 (e.g., magnetic tape apparatus, HDD recording apparatus, DVD recording apparatus and the like), access correspondence information of, for example, WWN, LUN, and WWN of a host computer port is set from a subsystem management terminal. In this manner, a correspondence table between a host computer WWN and a device identifier can be formed for external devices of the storage subsystem.

As the setting unit, a maintenance setting terminal of the storage subsystem connected to the storage subsystem via a LAN or telephone line is generally used. The location of a setter, the types of the setting unit or setting terminal, and the type of the network to be used are not limited specifically in this invention. WWN of each of these units is assumed already known.

Setting can be made at a site near to the storage subsystem if LAN is used as the communication line, or at a remote site such as a maintenance center if a telephone line is used.

LUN indicates the port of the logical unit (LU). The number of WWNs corresponds to the number of host computers which may access LU related to each port. The number of LUs and host computers are a finite number.

In this embodiment, it is assumed that each element in the table having the value "1" corresponds to access permission and each element having the value "0" corresponds to access rejection.

In the example shown in FIG. 12, in this port, host computers capable of accessing the 0-th LUN (12210) is the host computers having WWNs of "0123456789ABCDEF" and "0123456789ABCDED". A host computer capable of accessing the 1-st LUN (12220) is the host computer having WWN of "0123456789ABCDEE". In this example shown in FIG. 12, there is no host computer which can access (n−1)-th LUN (12230).

A host computer issues an EXTENDED COPY command to a logical device of the storage subsystem. Upon reception of the command, the storage subsystem checks WWN of the host computer and the identifier of LUN of the logical device at the command transmission destination. After it is determined whether the access is permitted or not, the logical device receives the command and analyzes the contents of the command. If the received command is the EXTENDED COPY command, the EXTENDED COPY processing unit 2230 controls to make the logical device which received the command as a copy manager. The copy manager controls to perform a copy of data (target copy data) from the copy source logical device to the copy destination logical device written in the command.

Figure 13:
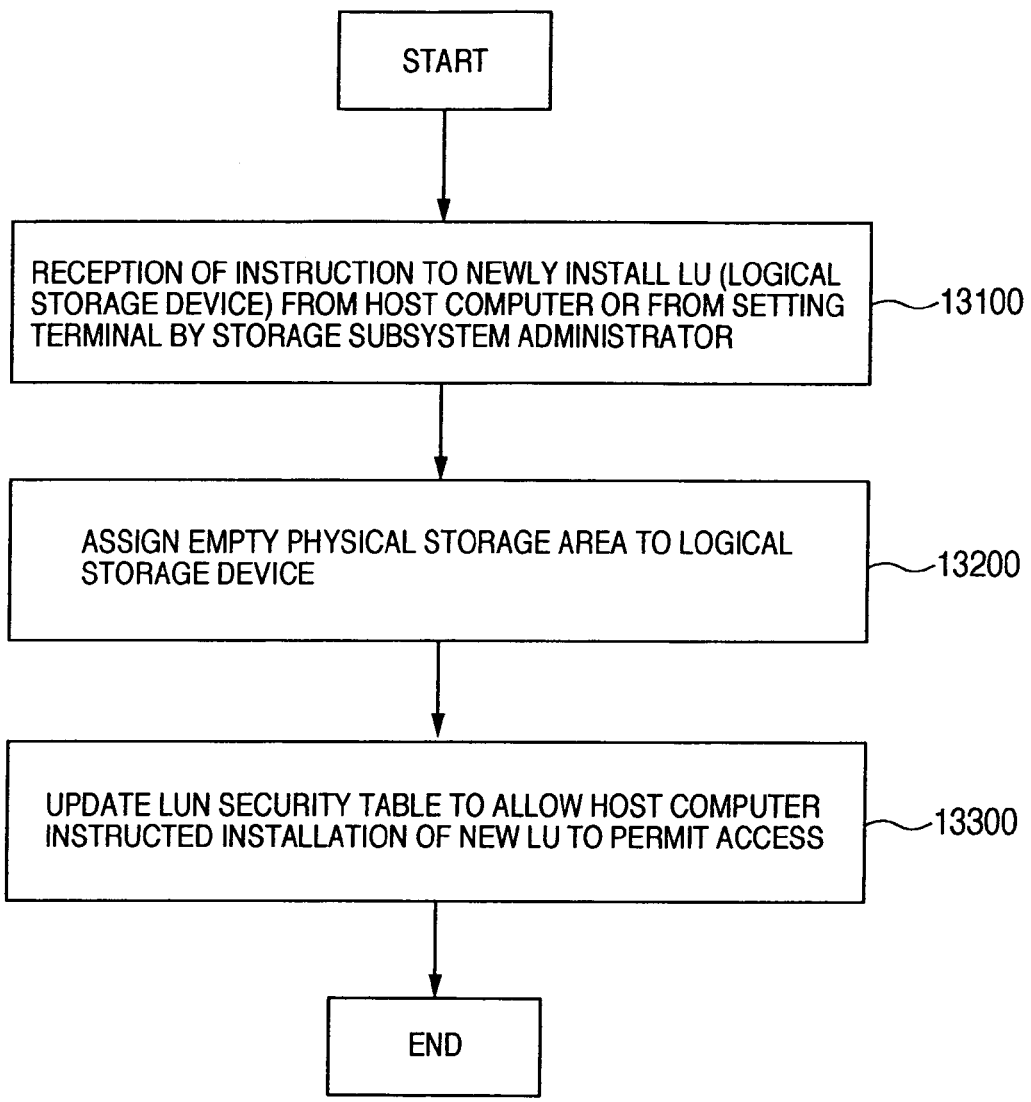
FIG. 13 is a flow chart illustrating an example of an operation of updating the LUN-WWN access permission/rejection information.

FIG. 13 is a flow chart illustrating an example of an operation of updating the LUN-WWN access permission/rejection information. This operation will be descried. In the example to be described herein, an example of the procedure to be performed by the storage subsystem control unit for setting the two tables will be described. One table described with reference to FIG. 11 stores a correspondence between S_ID in the fibre channel frame transmitted from the upper level apparatus (e.g., host computer) to the storage subsystem. The other table described with reference to FIG. 12 pertains to the LUN-WWN access permission/rejection information 2221 shown in FIG. 2 and stores a correspondence between a host computer WWN and an accessible LUN (such as port log-in) of each port of the storage subsystem. In an example to follow, a new logical device other than a preset logical device is set.

(1) A host computer or backup server instructs to assign a volume of a designated empty physical storage area to a new logical device for a remote copy use, by using the I/O network 2600 or network 2500. This volume is physically remote from the volume to which the host computer performs an I/O process and is used as a replication (static image) device of the logical volume to which a read/write process is performed, or as a disaster recovery device. Alternatively, a storage subsystem administrator instructs to assign the remote designated empty physical storage area to the new logical device by using the setting terminal 2700 in response to a request from a user of the host computer. In response to the request, the storage subsystem control unit 2200 assigns the designated empty physical storage area to the new logical device and the logical/physical correspondence unit 2212 updates the logical/physical correspondence information 2211 (Steps 13100, 13200)

(2) The storage subsystem control unit 2200 updates the LUN-WWN access permission/rejection information 2221 described with reference to FIG. 12 for the assigned logical device. For example, for the newly assigned logical device, permission is granted to WWN of the instructed backup server and WWN of the host computer which performs the I/O process on the volume side for the data to be backed up (Step 13300).

Update of the LUN-WWN access permission/ rejection information 2221 may be performed by the storage subsystem administrator by using the setting terminal, or may be performed by the command processing unit 2213 of the storage subsystem control unit by executing programs for LUN security setting.

Figure 14:
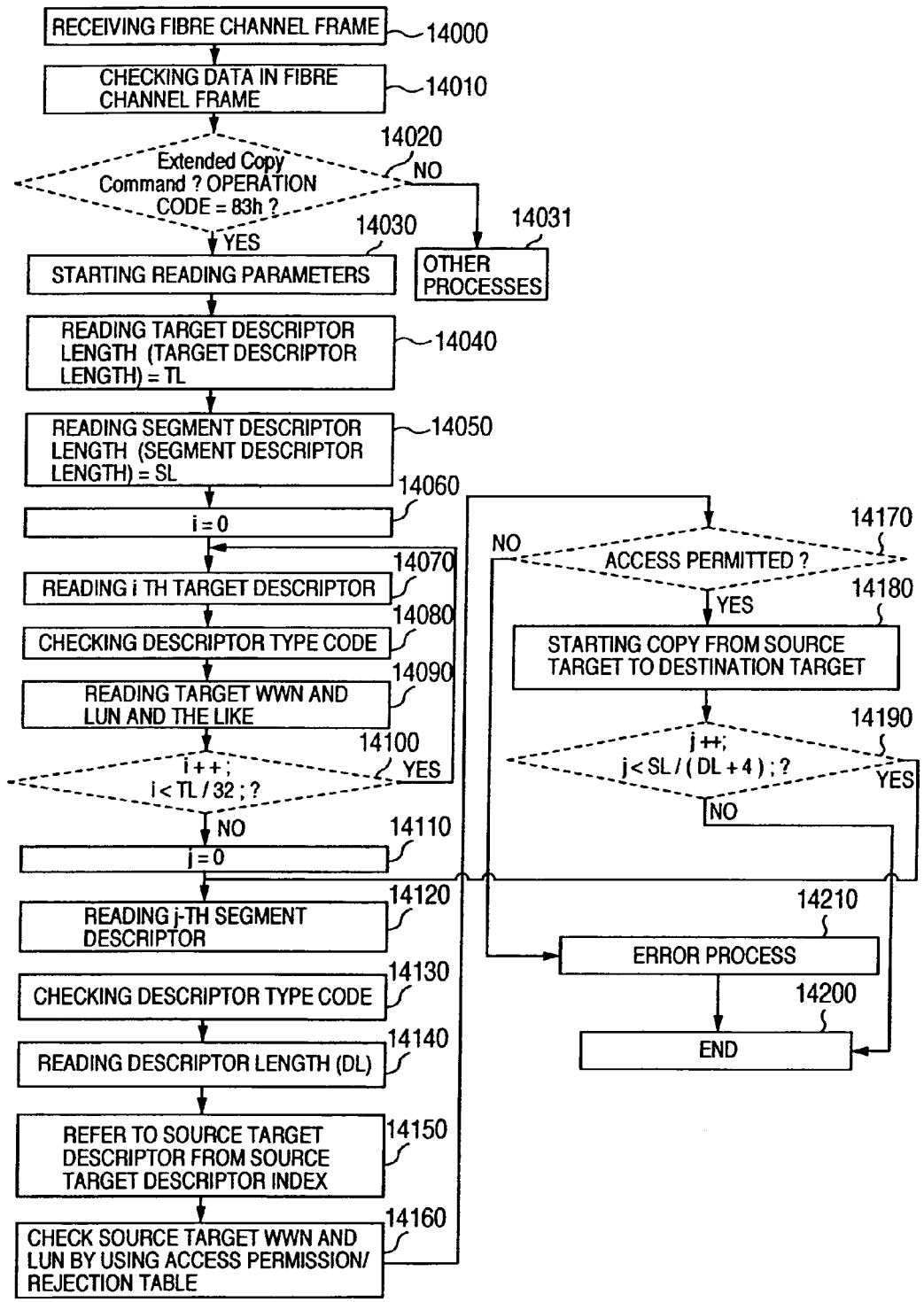
FIG. 14 is a flow chart illustrating an example of the operation for a device relative to which a SCSI EXTENDED COPY command is received via a fibre channel network.

FIG. 14 is a flow chart illustrating an example of the operation for a device relative to which the SCSI EXTENDED COPY command is received via the fibre channel network. This operation will be described. In an example to follow, the operation for the device relative to which the command is received is performed by the storage subsystem control unit 2200, EXTENDED COPY access processing unit 2230 and EXTENDED COPY access control unit 2231 in response to the received fibre channel frame after the transmission of a SCSI EXTENDED COPY command from the upper level apparatus via the fibre channel network.

It is herein assumed that an EXTENDED COPY command is transmitted as a frame shown in FIG. 9 and containing an information unit called FCP_CMND, from a host computer to the storage subsystem via the fibre channel network.

(1) In the fibre channel log-in process, the storage subsystem which receives a fibre channel frame from a host computer shown in FIG. 2 derives S_ID and WWN from the fibre channel frame, creates a correspondence table such as shown in FIG. 11 between S_ID and WWN of the host computer which is the transmission source of the fibre channel frame, and checks whether the host computer is permitted to access the designated device in the storage subsystem, by referring to the table shown in FIG. 12. Thereafter, the storage subsystem receives a fibre channel frame transmitted from the host computer relative to a specific internal logical device (Step 14000).

(2) Upon reception of the fibre channel frame, S_ID is picked up from the frame header in order to identify WWN of the host computer which transmitted the frame. Next, the frame data field is read, and if a command device block (CDB) exists in the fibre channel frame, it is checked whether the contents of the command is an EXTENDED COPY command (Steps 14010, 14020).

(3) If it is determined at Step 14020 that the received fibre channel frame is not the EXTENDED COPY command, the flow performs other processes (Step 14031).

(4) If it is determined at Step 14020 that the received fibre channel frame is the EXTENDED COPY command, the parameter length in CDB is checked. If the parameter length is 0, the process is terminated. If the parameter length is not 0, the command parameter list after CDB shown in FIG. 4 starts being read (Step 14030).

(5) After the list ID and the like in the command parameter list are read, the target descriptor length in 2-nd and 3-rd bytes is read (Step 14040).

(6) Next, the segment descriptor length in 8-th to 11-th bytes is read. The segment descriptor length is assumed to be represented by SL (Step 14050).

(7) After the inline data length in the parameter list is read, the target descriptor of one target descriptor length (32 bytes) is sequentially read. The number of target descriptors contained in the EXTENDED COPY command is TL/32. The format of the target descriptor has already been described with reference to FIG. 5. The descriptor type code is first read and then target WWN and LUN are read. The process of reading one target descriptor is repeated by the number of target descriptors (TL/32) (Steps 14060 to 14100).

(8) Next, a segment descriptor is read. The format of the segment descriptor has already been described with reference to FIG. 8. The descriptor type code, descriptor length (DL) and the like are first read. Thereafter, the descriptor index of the source target as the copy source logical device and the descriptor index of the destination target as the copy destination logical device are read (Steps 14120 to 14150).

(9) By using the target descriptor index described in the segment descriptor as a search key, the target descriptor shown in FIG. 5 is referred to to read the source target WWN and LUN. By referring to the access permission/rejection table showing a correspondence between the host computer of WWN and the logical device of LUN shown in FIG. 12, it is checked whether the host computer of WWN transmitted the source target WWN and LUN and the EXTENDED COPY command can access the logical device designated by the source target (Steps 14160 and 14170).

(10) If it is determined at Step 14170 that an access is permitted, the remaining segment descriptors are read to read the transfer length, block device number, block device LBA and the like and perform a copy of the designated copy target data from the logical device designated as the source target to the logical device designated as the destination target (Step 14180).

(11) The processes from Step 14120 of reading the next segment descriptor are repeated by SL/(DL+4) calculated from the descriptor length DL and segment descriptor length SL (Steps 14110 to 14190).

(12) If it is determined at Step 14170 that an access to the logical device designated as the source target is rejected or impossible, the EXTENDED COPY command is terminated in a CHECK CONDITION status. For example, COPY ABORT is set to a sense key and COPY TARGET DEVICE NOT REACHABLE is set to a sense code. As a corresponding exception process, a proper error process defined by the EXTENDED COPY command is performed to notify an error to the host to thereafter terminate the process (Steps 14210 and 14200).

Although the error process is performed when the access is rejected, an error process of the command itself is defined by the EXTENDED COPY command at each Step and this process is performed when such an error occurs.

(13) If it is determined at Step 14190 that the above-described process has been completed for all segment descriptors, and if the inline data length is 0, then a normal end process defined by the EXTENDED COPY command is performed to terminate the whole process (Step 14200).

Figure 15:
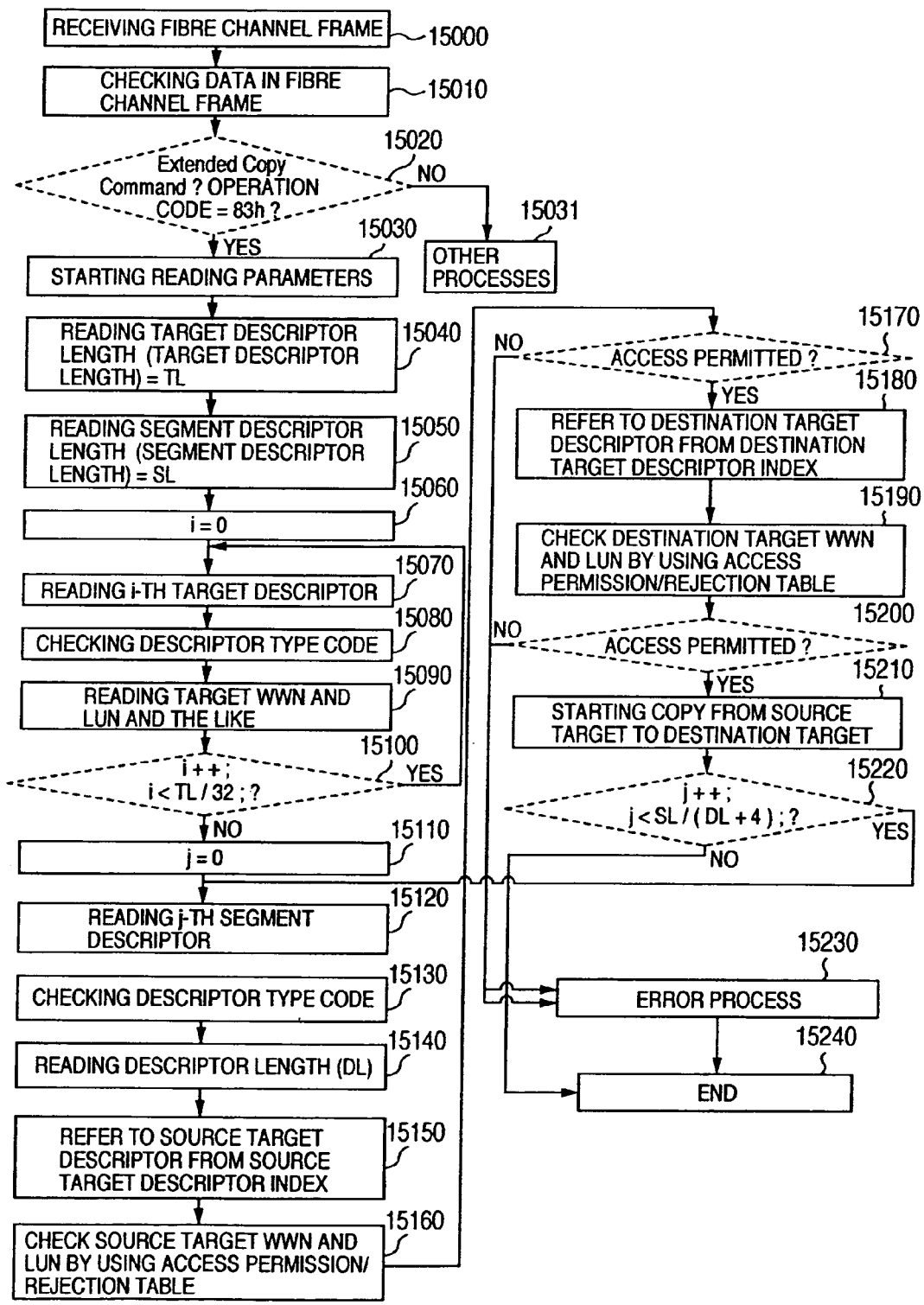
FIG. 15 is a flow chart illustrating another example of the operation for a device which receives a SCSI EXTENDED COPY command via the fibre channel network.

FIG. 15 is a flow chart illustrating another example of the operation for a device relative to which the SCSI EXTENDED COPY command is received via the fibre channel network. This operation will be described. In an example to follow, the operation for the device relative to which the command is received is performed by the storage subsystem control unit 2200, EXTENDED COPY access processing unit 2230 and EXTENDED COPY access control unit 2231 in response to the received fibre channel frame after the transmission of a SCSI EXTENDED COPY command from the upper level apparatus via the fibre channel network. In this example, the flow control shown in FIG. 14 is added with a process (Steps 15170 to 15190) of checking also WWN and LUN described in the destination target descriptors by using the access permission/rejection table. This process can be executed, for example, in order not to execute the EXTENDED COPY process by designating as a copy destination a logical volume reserved for replication or remote copy in the storage subsystem.

The copy source logical device and copy destination logical device may be: 1) the same logical device in the same storage subsystem (e.g., one of the devices 2401, 2407 and 2410); 2) different devices in the same storage subsystem (e.g., two among the devices 2401, 2407 and 2410); 3) the logical device in the same storage subsystem (e.g., one of the devices 2401, 2407 and 2410) and the external logical device of the storage subsystem (e.g., device 2800 shown in FIG. 2) or the logical device in another storage subsystem.

It is herein assumed that an EXTENDED COPY command is transmitted as a frame shown in FIG. 9 and containing an information unit called FCP_CMND, from a host computer to the storage subsystem via the fibre channel network.

(1) In the fibre channel log-in process, the storage subsystem which receives a fibre channel frame from a host computer shown in FIG. 2 derives S_ID and WWN from the fibre channel frame, creates a correspondence table such as shown in FIG. 11 between S_ID and WWN of the host computer which is the transmission source of the fibre channel frame, and checks whether the host computer is permitted to access the designated device in the storage subsystem, by referring to the table shown in FIG. 12. Thereafter, the storage subsystem receives a fibre channel frame transmitted from the host computer relative to a specific internal logical device (Step 15000).

(2) Upon reception of the fibre channel frame, S_ID is picked up from the frame header in order to identify WWN of the host computer which transmitted the frame. Next, the frame data field is read, and if a command device block (CDB) exists in the fibre channel frame, it is checked whether the contents of the command is an EXTENDED COPY command (Steps 15010, 15020).

(3) If it is determined at Step 15020 that the received fibre channel frame is not the EXTENDED COPY command, the flow performs other processes (Step 15031).

(4) If it is determined at Step 15020 that the received fibre channel frame is the EXTENDED COPY command, the parameter length in CDB is checked. If the parameter length is 0, the process is terminated. If the parameter length is not 0, the command parameter list after CDB shown in FIG. 4 starts being read (Step 15030).

(5) After the list ID and the like in the command parameter list are read, the target descriptor length in 2-nd and 3-rd bytes is read (Step 15040).

(6) Next, the segment descriptor length in 8-th to 11-th bytes is read. The segment descriptor length is assumed to be represented by SL (Step 15050).

(7) After the inline data length in the parameter list is read, the target descriptor of one target descriptor length (32 bytes) is sequentially read. The number of target descriptors contained in the EXTENDED COPY command is TL/32. The format of the target descriptor has already been described with reference to FIG. 5. The descriptor type code is first read and then target WWN and LUN are read. The process of reading one target descriptor is repeated by the number of target descriptors (TL/32) (Steps 15060 to 15100).

(8) Next, a segment descriptor is read. The format of the segment descriptor has already been described with reference to FIG. 8. The descriptor type code, descriptor length (DL) and the like are first read. Thereafter, the descriptor index of the source target as the copy source logical device and the descriptor index of the destination target as the copy destination logical device are read (Steps 15120 to 15150).

(9) By using the target descriptor index described in the segment descriptor as a search key, the target descriptor shown in FIG. 5 is referred to to read the source target WWN and LUN. By referring to the access permission/rejection table showing a correspondence between the host computer of WWN and the logical device of LUN shown in FIG. 12, it is checked whether the host computer of WWN transmitted the source target WWN and LUN and the EXTENDED COPY command can access the logical device designated by the source target (Steps 15160 and 15170).

(10) If it is determined at Step 15170 that the access is permitted, the descriptor index of the destination target as the copy destination logical device is read to refer to the target descriptor (Step 15180).

(11) By using the target descriptor index described in the segment descriptor as a search key, the target descriptor shown in FIG. 5 is referred to to read the destination target WWN and LUN. By referring to the access permission/rejection table showing a correspondence between the host computer of WWN and the logical device of LUN shown in FIG. 12, it is checked whether the host computer of WWN transmitted the destination target WWN and LUN and the EXTENDED COPY command can access the logical device designated by the source target (Steps 15190 and 15200).

(12) If it is determined at Step 15200 that an access is permitted, the remaining segment descriptors are read to read the transfer length, block device number, block device LBA and the like and perform a copy of the designated copy target data from the logical device designated as the source target to the logical device designated as the destination target (Step 15210).

(13) The processes from Step 15120 of reading the next segment descriptor are repeated by SL/(DL+4) calculated from the descriptor length DL and segment descriptor length SL (Steps 15110 to 15220).

(14) If it is determined at Steps 15170 and 15200 that an access to the logical device designated as the source target or destination target is rejected or impossible, the EXTENDED COPY command is terminated in a CHECK CONDITION status. For example, COPY ABORT is set to a sense key and COPY TARGET DEVICE NOT REACHABLE is set to a sense code. As a corresponding exception process, a proper error process defined by the EXTENDED COPY command is performed to notify an error to the host to thereafter terminate the process (Steps 15230 and 15240).

Although the error process is performed when the access is rejected, an error process of the command itself is defined by the EXTENDED COPY command at each Step and this process is performed when such an error occurs.

(15) If it is determined at Step 15220 that the above-described process has been completed for all segment descriptors, and if the inline data length is 0, then a normal end process defined by the EXTENDED COPY command is performed to terminate the whole process (Step 15240).

According to the embodiment of the invention, a storage subsystem coupled to a computer includes an access permission/rejection determination unit which determines a permission/rejection of an access by referring to access permission/rejection information of an access between an upper level apparatus identifier and a unit which determines whether a copy process is permitted or not when a copy process by an active copy instruction command from the inside of the storage subsystem is issued.

According to the present invention, a data copying method of performing a data copy process for a logical device (2401 to 2420) without intervening a computer, includes the steps of:

determining from a data copy instruction from the computer whether an access to a logical storage device (2401, 2407, 2410) is permitted or not; and performing the data copy process relative to the logical storage device in accordance with a determination result of an access permission/rejection to the logical storage device.

According to the invention, a storage subsystem (2100) coupled to a computer (e.g., 2000), includes:

a logical storage device (e.g., 2401) to which an I/O process is performed by the computer;

a port (2101, 2102) which receives an I/O processing request from the computer; and a processing unit (2200) which controls the logical storage device in response to the I/O processing request, wherein the processing unit comprises:

an access permission/rejection table (2221, FIG. 12) which stores a correspondence between the logical storage device (e.g., 2401) and identification information (WWN) for identifying the computer or the port of the computer, and defines an access permission/rejection of the computer to the logical storage device;

a relational table (FIG. 11) which stores a relation between the identification information (WWN) and an address identifier (S_ID) for identifying the port (2101, 2102) for receiving a frame, the address identifier and the identification information being contained in a communication processing request transmitted from the computer to the storage subsystem;

a determination unit (2220, 2221) which determines the identification information from the relational table and the address identifier in the communication processing request and determines whether an access to the logical storage device from the computer is permitted or not, in accordance with the determined identification information and the access permission/rejection table; and a control unit (2230) responsive to a data copy instruction from the computer which control unit controls a data copy process relative to the logical storage device in accordance with an access permission/rejection determination result by the determination unit.

An access permission/rejection to a logical device in the storage subsystem from an upper level apparatus such as a host computer is checked from the correspondence between WWN of the upper level apparatus and the logical device identifier. In processing an active copy instruction command from the inside of the storage subsystem issued to the storage subsystem from the upper level apparatus, the logical device received the copy instruction command as the copy designated device checks the access control of the copy source device and copy destination device. It is therefore possible to prevent an outflow of illegal data from the storage subsystem to be caused by the active copy instruction command from the inside of the storage subsystem.

In the above embodiments, although the fibre channel (FC) has been described, the invention is also applicable to iSCSI. In this case, WWN of a host computer is replaced by iSCSI NAME of the host computer to form the table shown in FIG. 12. The effects similar to the fibre channel can also be obtained for iSCSI.

As described so far, according to the present invention, a security check of the copy source volume at the WWN level can be realized for a data copy instruction from the inside of the storage subsystem which uses a control command such as a SCSI EXTENDED COPY command. It is possible to prevent illegal data copy by selectively limiting an access to the storage subsystem or a storage area in the storage subsystem from a plurality of upper level apparatuses.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A storage subsystem coupled to a computer, comprising:
   a logical storage device to which an I/O process is performed by said computer;
   a determination unit which determines whether an access to said logical storage device is permitted or not, in accordance with an instruction from said computer for an operation to be performed with respect to said logical storage device; and
   a processing unit responsive to said instruction from said computer which processing unit performs said operation without involving said computer, in accordance with a determination result produced by said determination unit,
   wherein, in response to said instruction from said computer, said determination unit determines whether or not an access to the logical storage device for said instruction is permitted based on a correspondence between identification information of said computer and identification information of said logical storage device,
   wherein, if said instruction is permitted to the access to said logical storage device, said determination unit determines whether or not accesses to a source logical storage device and a destination logical storage device among said logical storage device and another logical storage device are permitted, based on a correspondence between identification information of said computer and identification information of said source logical storage device and a correspondence between said identification information of said computer and identification information of said destination logical storage device, said identification information of said source logical storage device and said destination logical storage device being indicated in said instruction, and
   wherein said another logical storage device is one of a logical storage device of said storage subsystem, an external logical storage device coupled to said storage subsystem, or a logical storage device of another storage subsystem coupled to said storage subsystem.

2. The apparatus of claim 1 wherein said instruction is a data copy instruction.

3. A storage control apparatus coupled to a computer, comprising:
   a unit which performs an I/O process relative to a logical storage device to which said I/O process is performed by said computer;
   a determination unit which determines whether an access to said logical storage device is permitted or not, in accordance with an instruction from said computer for an operation to be performed with respect to said logical storage device; and
   a processing unit responsive to said instruction from said computer which processing unit performs said operation without involving said computer, in accordance with a determination result produced by said determination unit,
   wherein, in response to said instruction from said computer, said determination unit determines whether or not an access to the logical storage device for said instruction is permitted based on a correspondence between identification information of said computer and identification information of said logical storage device,
   wherein, if said instruction is permitted to the access to said logical storage device, said determination unit determines whether or not accesses to a source logical storage device and a destination logical storage device among said logical storage device and another logical storage device are permitted, based on a correspondence between identification information of said computer and identification information of said source logical storage device and on a correspondence between said identification information of said computer and identification information of said destination logical storage device, said identification information of said source logical storage device and said destination logical storage device being indicated in said instruction, and
   wherein said another logical storage device is one of a logical storage device of said storage control apparatus, an external logical storage device coupled to said storage control apparatus, or a logical storage device of another storage control apparatus coupled to said storage control apparatus.

4. The apparatus of claim 3 wherein said instruction is a data copy instruction.

5. A method in a storage subsystem comprising:
   receiving an instruction from a computer in data communication with said storage subsystem;
   in response to said instruction from said computer, determining whether or not an access to a logical storage device for said instruction is permitted based on a correspondence between identification information of said computer and identification information of said logical storage device; and
   selectively accessing a source logical device and a destination logical device from among two or more logical storage devices, based at least on a correspondence between identification information of said computer and identification information of said source logical storage device and on a correspondence between said identification information of said computer and identification information of said destination logical storage device,
said instruction including information indicative of said identification information of said source logical storage device and of said destination logical storage device,
said logical storage devices comprising one or more of a logical storage device of said storage subsystem, an external logical storage device coupled to said storage subsystem, or a logical storage device of another storage subsystem coupled to said storage subsystem.

6. The method of claim 5 wherein said instruction is a data copy instruction.

* * * * *